Figure 1:
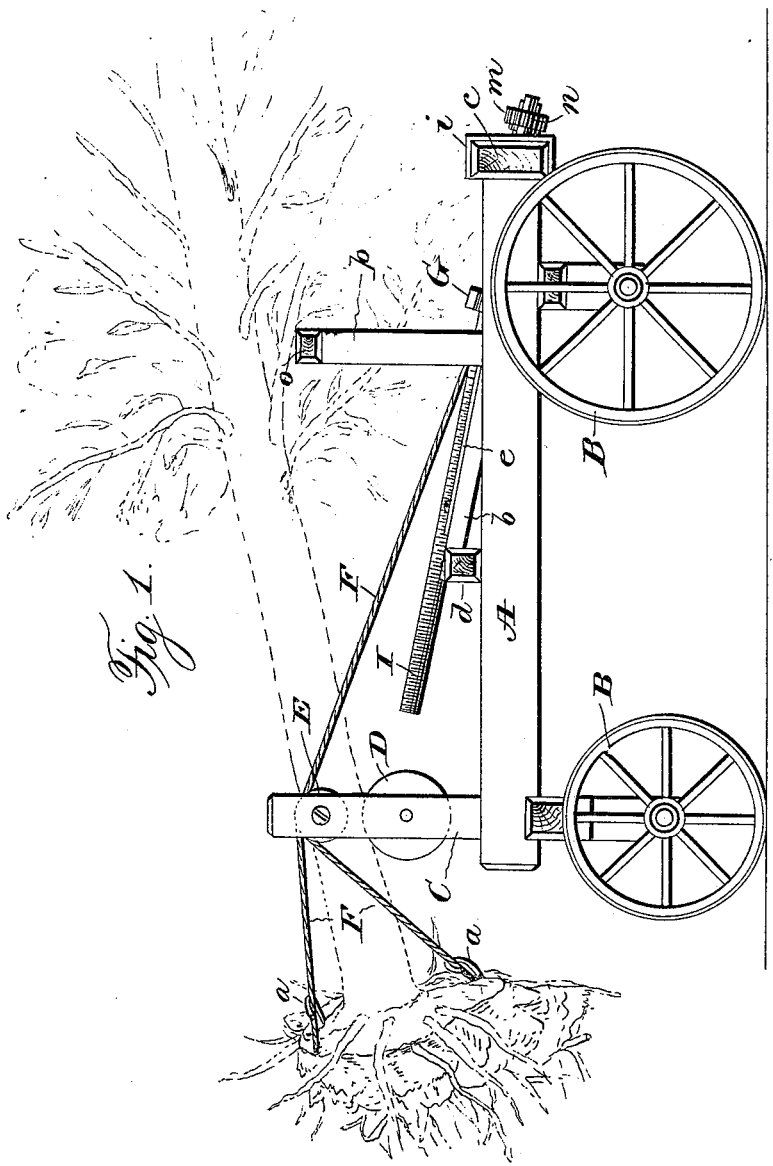

No. 636,842. Patented Nov. 14, 1899.
D. RALSTON.
APPARATUS FOR TRANSPLANTING TREES.
(Application filed Aug. 25, 1899.)
(No Model.) 2 Sheets—Sheet 1.

WITNESSES
Jas E Hutchinson.
G. F. Downing.

INVENTOR
David Ralston
By H. A. Seymour
Attorney

THE NORRIS PETERS CO., PHOTO-LITHO., WASHINGTON, D. C.

No. 636,842. Patented Nov. 14, 1899.
D. RALSTON.
APPARATUS FOR TRANSPLANTING TREES.
(Application filed Aug. 25, 1899.)//(No Model.) 2 Sheets—Sheet 2.
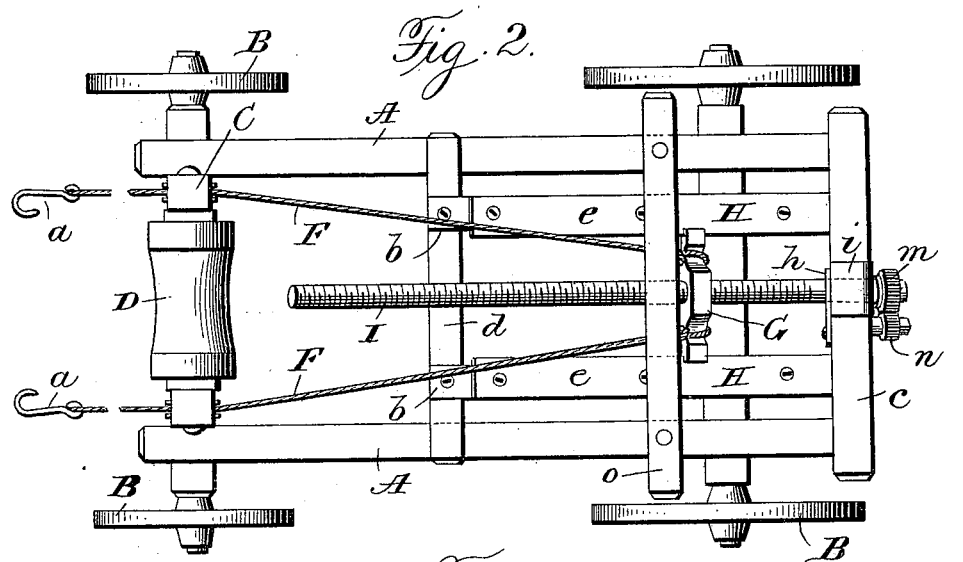
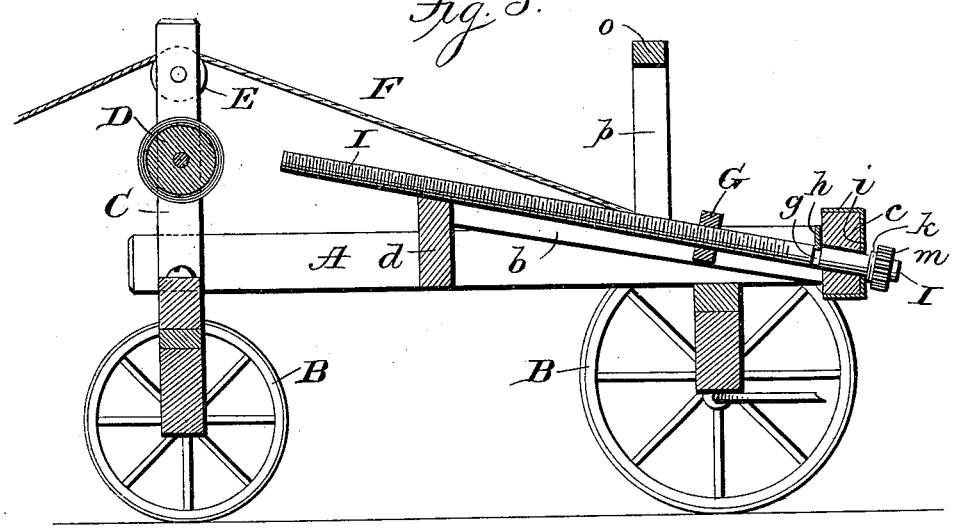
WITNESSES
Jas E Hutchinson.
G. F. Downing.
INVENTOR
David Ralston
By H. A. Seymour
Attorney

UNITED STATES PATENT OFFICE.

DAVID RALSTON, OF ASBURY PARK, NEW JERSEY, ASSIGNOR OF TWO-THIRDS TO JAMES M. RALSTON AND EDWIN N. RALSTON, OF SAME PLACE.

APPARATUS FOR TRANSPLANTING TREES.

SPECIFICATION forming part of Letters Patent No. 636,842, dated November 14, 1899.

Application filed August 25, 1899. Serial No. 728,454. (No model.)

*To all whom it may concern:*

Be it known that I, DAVID RALSTON, of Asbury Park, in the State of New Jersey, have invented certain new and useful Improvements in Apparatus for Transplanting Trees; and I do hereby declare the following to be a full, clear, and exact description of the invention, such as will enable others skilled in the art to which it appertains to make and use the same.

My invention relates to an apparatus for transplanting trees; and it consists in a wheeled vehicle carrying power devices for elevating the tree with its roots and attached soil from its original bed and means for supporting the tree in an inclined position while being removed.

My invention further consists in the parts and combinations of parts, as will be more fully described, and pointed out in the claims.

In the accompanying drawings, Figure 1 is a view in side elevation of the apparatus embodying my invention, showing a tree thereon in position for transportation. Fig. 2 is a plan view of same, and Fig. 3 is a view in vertical longitudinal section.

A represents a strong heavy body mounted on the wheels B, the front wheels of which are journaled on an axle secured to the body of the vehicle by an ordinary fifth-wheel, so that the vehicle thus formed may be readily turned and manipulated. Secured to the front end of the body A are the upright standards C, carrying the drum D. This drum D is journaled on a suitable support carried by the standards C and is preferably provided with a concaved face, which tends to hold or guide the tree-trunk to a central position thereon. Secured within slots in the standards and above the drum D are the pulleys E, over which the ropes or cables F pass. The outer free end of each rope or cable is preferably provided with a hook $a$, while the inner ends of said ropes or cables are attached to the cross-head G, mounted on the inclined guideway H. This guideway H preferably consists of two heavy timbers $b$, secured at their front ends to the bolster $d$ and at their rear ends to the rear sill $c$ of the frame or body A. Secured to the top face of the timbers $b$ are the metal plates $e$, which latter overlap the inner faces of the timbers $b$ and enter slots in the ends of cross-head G. This cross-head G is provided centrally with a female-threaded opening to receive the longitudinal screw I, which latter is mounted at its rear end in a bearing formed in the rear sill $c$ of the body or frame A. This screw I is provided at a point immediately in front of the sill $c$ with a groove $g$, adapted to receive the latch $h$, pivoted to the front face of said sill $c$. When this latch is in engagement with the screw, the latter is retained against longitudinal movement. Hence it will be seen that by disengaging the latch from the screw the latter can be withdrawn for repairs or removal. The rear outer face of the sill $c$ is provided with a reinforcing or bearing plate $i$, against which the loose collar $k$ on the stem of the screw bears when the screw is under strain, thus relieving the sill proper from the wear that would otherwise fall thereon. Secured to the outer end of the screw is the pinion $m$, and pivotally mounted on a bearing secured to the rear face of the sill $c$ is the smaller pinion $n$, meshing with the pinion $m$ on the screw-shaft. The smaller pinion $n$ is preferably provided with an angular shank or shaft for the attachment of a crank by which the screw may be turned.

To operate the device, the roots of the tree to be removed and transplanted are first separated from the surrounding soil, the earth covering the roots remaining undisturbed. The ends of the ropes or cables are then made fast to the roots of the tree or to a rope which has been previously passed around the roots and the soil adhering thereto, after which the screw is turned in a direction to draw the cross-head down the inclined guideway, thus elevating the tree sufficiently for the roots thereof to clear the ground, the top of the tree being steadied in the meantime by the drum, with which it moves in contact, and by guy-ropes, which have been previously secured to the trunk of the tree. After the roots have been elevated clear of the ground the tree is tilted so as to bring the trunk thereof onto the drum D. The tree may then be secured in its inclined position, with its weight on the drum, by the guy-ropes, previously referred to, or the tree may be drawn still farther inward until its trunk or branches rest on the elevated cross-bar o, which, as shown, is secured to the standards p, located over and adjacent to the rear wheels of the apparatus. I prefer, however, to always have the preponderance of weight in front of the drum D, so that when depositing the tree in a new location the latter will slide from the wagon by its own weight. After the tree has been placed on the apparatus as above explained the apparatus is moved by horses or otherwise and placed with its front end adjacent to the hole into which the tree is to be placed. By now turning the screw in the opposite direction and slackening up on the guy-ropes the tree gradually settles down into its position and can be supported by the guy-ropes until it has been properly set and made secure in the ground.

With this device I have successfully moved a number of trees from eight to twelve inches in diameter with the aid of four men, one at each guy-rope and two at the screw; but by multiplying power at the screw trees of the size above referred to can be quickly transplanted by three men with the aid of a single team of horses.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. In an apparatus for transplanting trees, the combination with a body mounted on wheels, of standards secured at one end of said body, a drum secured to said standards, a movable cross-head, means for actuating the cross-head and ropes or cables secured to the cross-head and passing beyond the drum, substantially as set forth.

2. In an apparatus for transplanting trees, the combination with a body mounted on wheels, of standards secured to said body near one end thereof, a drum supported between said standards, a guideway located in rear of the drum, a cross-head mounted on the guideway, a screw for actuating the cross-head and ropes or cables connected to the cross-head, substantially as set forth.

3. In an apparatus for transplanting trees, the combination with a frame or body mounted on wheels, of standards secured to said body near one end thereof, a concave-faced drum carried by said standards, a movable cross-head located in rear of the drum, means for moving said cross-head, and ropes or cables attached to the cross-head and passing over pulleys carried by the drum-supporting standards, substantially as set forth.

4. In an apparatus for transplanting trees, the combination with a vehicle-body, upright standards secured to the same and near one end, a concave-faced drum supported by and between said standards, and a pulley in each standard, the said pulleys being in a plane above the drum of a guideway, a cross-head moving on said guideway, means for moving said cross-head and ropes or cables attached to said cross-head and passing over the pulleys in the standards, substantially as set forth.

5. In an apparatus for transplanting trees, the combination with a vehicle-body, upright standards and a drum carried by and between said standards, of a guideway, a cross-head upon said guideway, a screw mounted in the rear sill of the vehicle-body and engaging a female-threaded opening in the cross-head, a latch for locking the screw against displacement and ropes or cables secured to the cross-head, substantially as set forth.

6. In an apparatus for transplanting trees, the combination with a vehicle-body, an inclined guideway carried thereby, a cross-head mounted to slide on said guideway, a screw passing through the rear sill of the vehicle-body and engaging female threads in the cross-head, a collar on the screw and a reinforcing-plate on the rear sill against which said collar bears, of standards located in advance of the cross-head, a drum carried by and between said standards, pulleys carried by said standards in a plane above the drum and ropes or cables secured to said cross-head and passing over the pulleys, substantially as set forth.

In testimony whereof I have signed this specification in the presence of two subscribing witnesses.

DAVID RALSTON.

Witnesses:
DAVID HARVEY, Jr.,
EDWARD C. WYCKOFF.